US012103130B2

(12) United States Patent
Monsarrat et al.

(10) Patent No.: US 12,103,130 B2
(45) Date of Patent: Oct. 1, 2024

(54) BASE ATTACHMENT MODULE FOR SMALL AERIAL VEHICLES

(71) Applicant: NATIONAL RESEARCH COUNCIL OF CANADA, Ottawa (CA)

(72) Inventors: Bruno Monsarrat, Montreal (CA); Charles Vidal, Anjou (CA); Martin De Montigny, Lachine (CA); Iraj Mantegh, Pierrefonds (CA)

(73) Assignee: National Research Council of Canada, Ottawa (CA)

( * ) Notice: Subject to any disclaimer, the term of this patent is extended or adjusted under 35 U.S.C. 154(b) by 520 days.

(21) Appl. No.: 17/235,841

(22) PCT Filed: Oct. 18, 2019

(86) PCT No.: PCT/IB2019/058921
§ 371 (c)(1),
(2) Date: Apr. 20, 2021

(87) PCT Pub. No.: WO2020/079668
PCT Pub. Date: Apr. 23, 2020

(65) Prior Publication Data
US 2022/0063038 A1  Mar. 3, 2022

Related U.S. Application Data

(60) Provisional application No. 62/747,998, filed on Oct. 19, 2018.

(51) Int. Cl.
*B23Q 9/00* (2006.01)
*B64F 1/12* (2006.01)
*F16B 47/00* (2006.01)

(52) U.S. Cl.
CPC ............ *B23Q 9/0014* (2013.01); *B64F 1/12* (2013.01); *F16B 47/00* (2013.01)

(58) Field of Classification Search
CPC ... B64F 1/12; B64F 1/125; B64F 1/02; B64U 70/00; B64U 70/30; B64U 70/90; B64U 70/99; F16B 47/00
See application file for complete search history.

(56) References Cited

U.S. PATENT DOCUMENTS 7,410,125 B2   8/2008   Steele
8,955,801 B2   2/2015   McGeer et al.
(Continued)

FOREIGN PATENT DOCUMENTS

CN   102835935 A   12/2012
CN   102835936 A   12/2012
(Continued)

OTHER PUBLICATIONS

Albert Albers, Simon Trautmann, Thomas Howard, Trong Anh Nguyen, Markus Frietsch, Christian Sauter, Semi-autonomous Flying Robot for Physical Interaction with Environment, 2010 IEEE Conference on Robotics, Automation and Mechatronics, 2010; 441-446.
(Continued)

*Primary Examiner* — Brady W Frazier
*Assistant Examiner* — Shanna Danielle Glover
(74) *Attorney, Agent, or Firm* — Jason E. J. Davis

(57) ABSTRACT

A base attachment module (BAM) of a small aerial vehicle (SAV) for attaching the SAV to an unprepared work surface has a surface meeting docking assembly (DA) with contact points for contacting the work surface, and a contracting suction cup (CSC) in a position surrounded by the contact points such that it extends beyond a plane (or other surface contour) of the points in a fully extended operating position, and is retracted below the plane in a retracted position. Actuation of the CSC when in contact with the surface, allows for the DA to be brought into contact with the contact
(Continued)

points in a controlled manner, for a high stiffness attachment, as is needed for deployment of robotic tasks from a SAV.

19 Claims, 5 Drawing Sheets

(56) References Cited

U.S. PATENT DOCUMENTS

| | | | |
|---|---|---|---|
| 9,434,481 | B2 | 9/2016 | McGeer |
| 9,481,458 | B2 | 11/2016 | Casado Magaña et al. |
| 9,505,493 | B2 | 11/2016 | Borko |
| 9,527,605 | B1 | 12/2016 | Gentry et al. |
| 9,720,519 | B2 | 8/2017 | Verma |
| 2004/0094979 | A1 | 5/2004 | Damhuis |
| 2008/0077276 | A1* | 3/2008 | Montero Sanjuan ........................ B62D 57/024 901/1 |
| 2009/0050750 | A1 | 2/2009 | Goossen |
| 2011/0194906 | A1* | 8/2011 | Allen ................... B62D 57/032 409/235 |
| 2014/0034776 | A1 | 2/2014 | Hutson |
| 2015/0021429 | A1 | 1/2015 | Reichert |
| 2016/0068261 | A1 | 3/2016 | Niederberger |
| 2016/0082460 | A1 | 3/2016 | McMaster et al. |
| 2016/0229534 | A1 | 8/2016 | Hutson |
| 2016/0323751 | A1 | 11/2016 | Priest et al. |
| 2017/0066370 | A1* | 3/2017 | Bowe ...................... B60R 13/00 |
| 2017/0137118 | A1 | 5/2017 | Gentry |
| 2018/0333865 | A1* | 11/2018 | Bacci ....................... B27M 1/08 |
| 2019/0016071 | A1* | 1/2019 | Mackey ............ B32B 17/10963 |
| 2019/0283217 | A1* | 9/2019 | Tanaka ................... B64U 70/00 |

FOREIGN PATENT DOCUMENTS

| | | |
|---|---|---|
| CN | 102835937 A | 12/2012 |
| CN | 104802991 A | 7/2015 |
| CN | 205655746 U | 10/2016 |
| CN | 107264805 A | 10/2017 |
| DE | 2736176 A1 | 2/1979 |
| DE | 102014211721 A1 | 12/2015 |
| DE | 102016214655 A1 | 2/2018 |
| EP | 2003057 A2 | 12/2008 |
| ES | 2614994 B1 | 3/2018 |
| FR | 2926286 A1 | 7/2009 |
| FR | 3040688 A1 | 3/2010 |
| FR | 2926286 B3 | 9/2010 |
| JP | 2016160697 A | 9/2016 |
| NL | 2012975 B1 | 10/2016 |
| WO | 2014057046 A3 | 4/2014 |
| WO | 2016193667 A1 | 12/2016 |
| WO | 2017147188 A1 | 8/2017 |
| WO | 2012013878 A1 | 10/2017 |
| WO | 2017172932 A1 | 10/2017 |
| WO | 2019109164 A1 | 6/2019 |

OTHER PUBLICATIONS

Kostas, Alexis, Georgios Darivianakis, Michael Burri, Roland Siegwart, Aerial robotic contract-based inspection: planning and control, Springer Science+Business Media, Auton Robot, 2016; 40: 631-655.

Hao Jiang, Morgan T. Pope, Elliot W. Hawkes, David L. Christensen, Matthew A. Estrada, Andrew Parlier, Richie Tran and Mark Cutkosky, Modeling the Dynamics of Perching with Opposed-Grip Mechanisms, 2014 IEEE International Conference on Robotics & Automation(ICRA), 2014; 3102-3108.

T. Bartelds, A. Capra, S. Hamaza, S. Stramigioli, and M. Fumagalli, Compliant Aerial Manipulators: Toward a New Generation of Aerial Robotic Workers, IEEE Robotics and Auotmation Letters, vol. 1, No. 1, 2016; 477-483.

Carmine Dario Bellicoso, Luca Rosario Buonocore, Vincenzo Lippiello, and Bruno Siciliano, Design, Modelling and Control of a 5-DoF Light-Weight Robot Arm for Aerial Manipulation, Mediterranean Conference on Control and Auotmation( MED) IEEE, 2015; 853-858.

A.E. Jimenez-Cano, J. Braga, G. Heredia and A. Ollero, Aerial Manipulator for Structure Inspection by Contact from the Underside, IEEE/RSJ International Conference on Intelligent Robots and Systems (IROS) Congress Center Hamburg, Germany, 2015; 1879-1884.

K. Kondak, FL. Huber, M. Schwarzbach, M. Laiacker, D. Sommer, M. Bejar and A. Ollero, Aerial manipulation robot composed of an autoonomous helicopter and a 7 degrees of freedom industrial manipulator, 2014 IEEE International Conference on Robotics & Automation (ICRA), Hong Kong Convention and Exhibition Center, 2014; 2107-2112.

Christopher M. Korpela, Todd W. Danko and Paul Y. Oh, Designing a System for Mobile Manipulation from an Unmanned Aerial Vehicle, Drexel Autonomous Systems Lab, Drexel University, Philadelphia, PA, Licensed to National Research Council of Canada, Dec. 2021; IEEE Xplore, 109-114.

F. Ruggiero, M. A. Trujillo, R. Cano, H. Ascorbe, A. Viguria, C. Perez, V. Lippiello, A. Ollero, and B. Siciliano, A multilayer control for multirotor UAVS equipped with a servo robot arm, 2015 IEEE International Conference on Robotics and Automation ( ICRA) Washingto State Convention Center, 2015; 4014-4020.

Alejandro Suarez, Guillermo Heredia and Anibal Ollero, Lightweight Compliant Arm with Compliant Finger for Aerial Manipulation and Inspection, 2016 IEEE/RSJ International Conference on Intelligent Robots and systems ( IROS) Daejeon Convention Center, Daejeon, Korea, 2016; 4449-4454.

Chad C. Kessens, Justin Thomas, Jaydev P. Desai, Vijay Kumar, Versatile Aerial Grasping Using Self-Sealing Suction, 2016 IEEE International Conference on Robotics and Automation (ICRA) Stockholm, Sweden, May 16-21, 2016; 3249-3254.

* cited by examiner

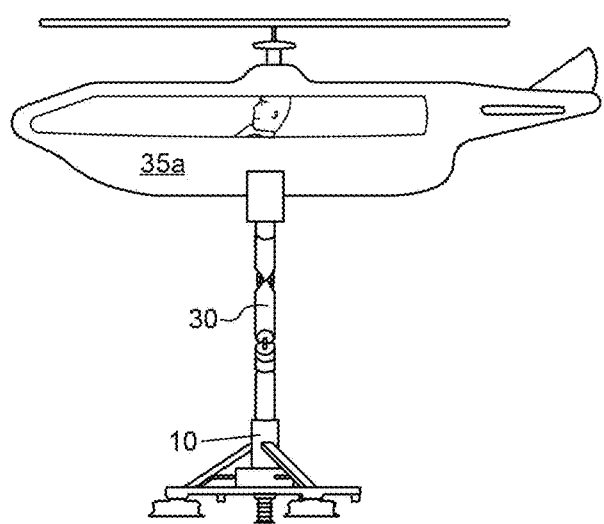
FIG. 4A
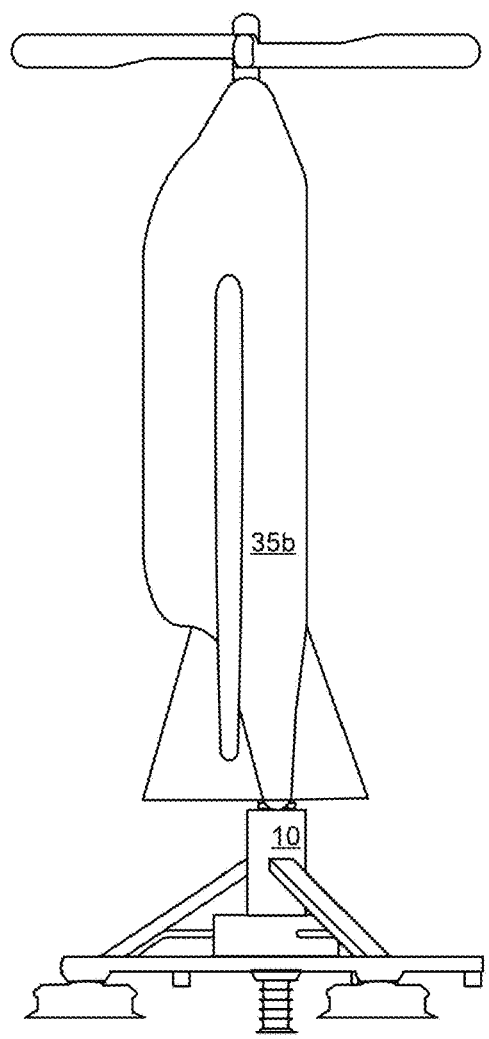
FIG. 4B
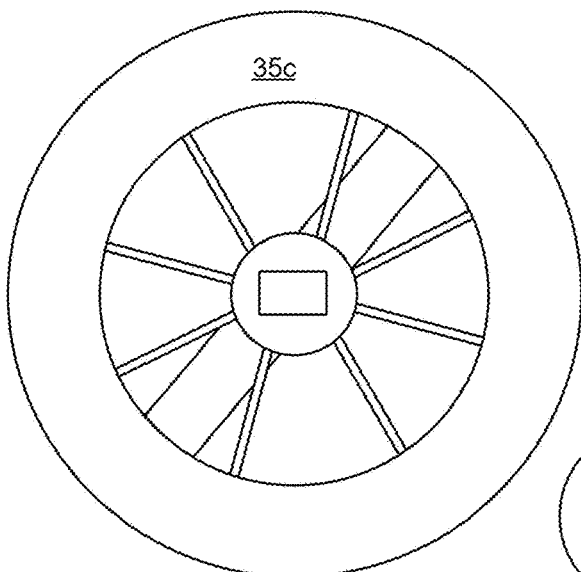
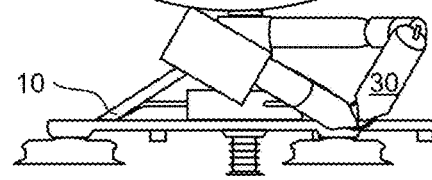
FIG. 4C
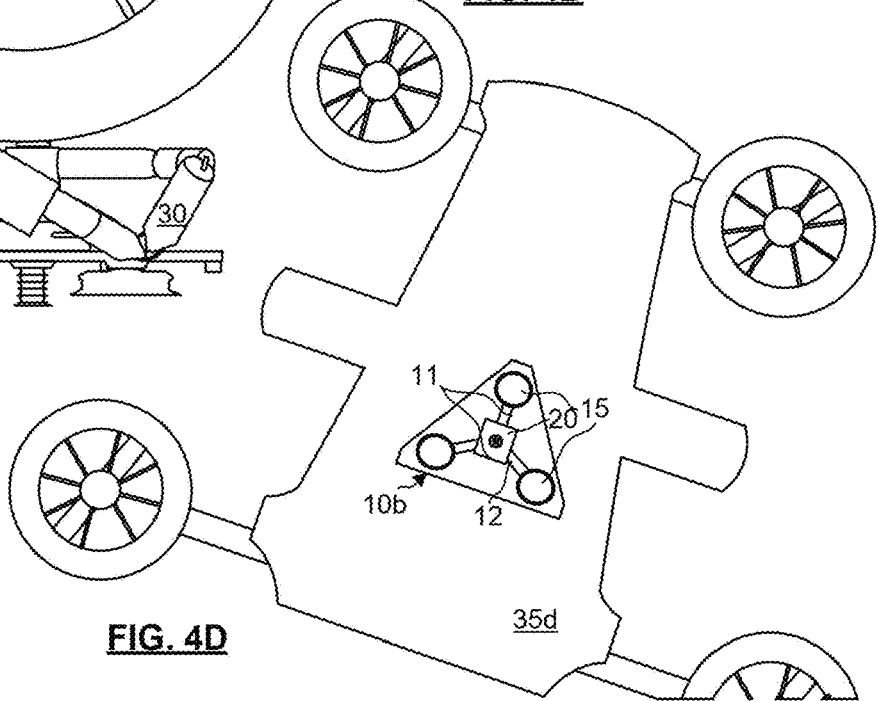
FIG. 4D

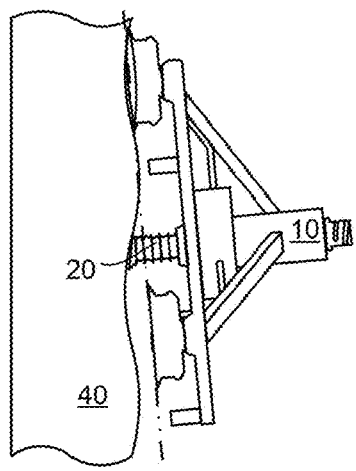
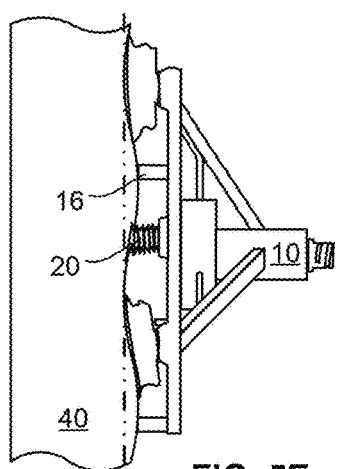
FIG. 5A  FIG. 5C  FIG. 5E
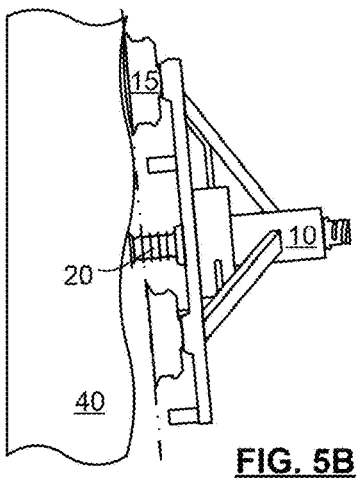
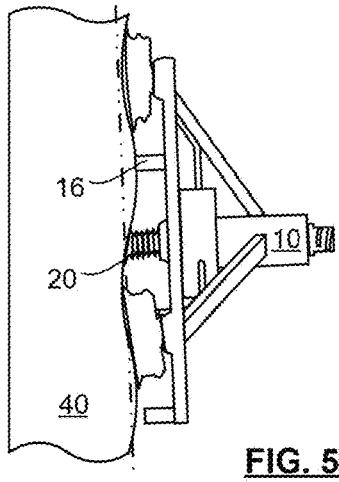
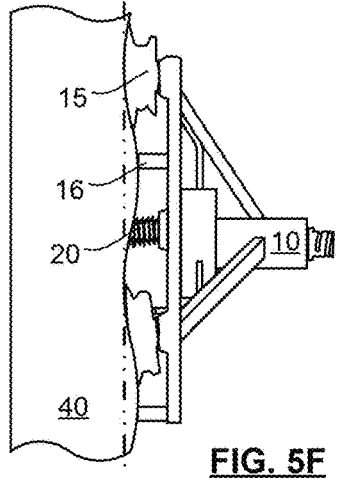
FIG. 5B  FIG. 5D  FIG. 5F
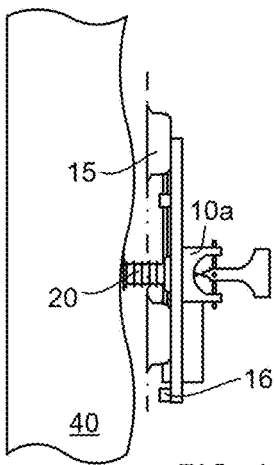
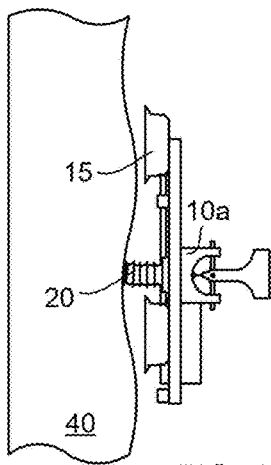
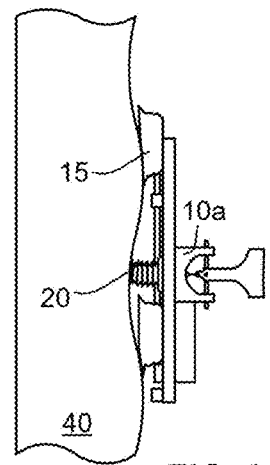
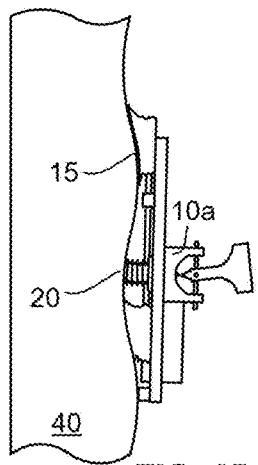
FIG. 6A  FIG. 6B  FIG. 6C  FIG. 6D
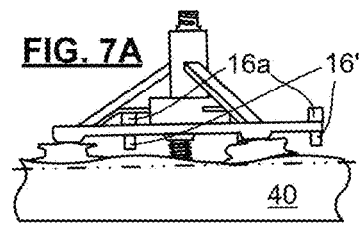
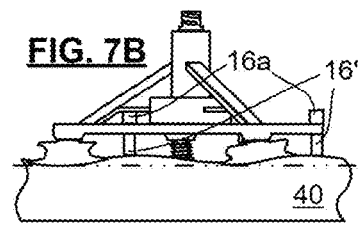
FIG. 7A  FIG. 7B

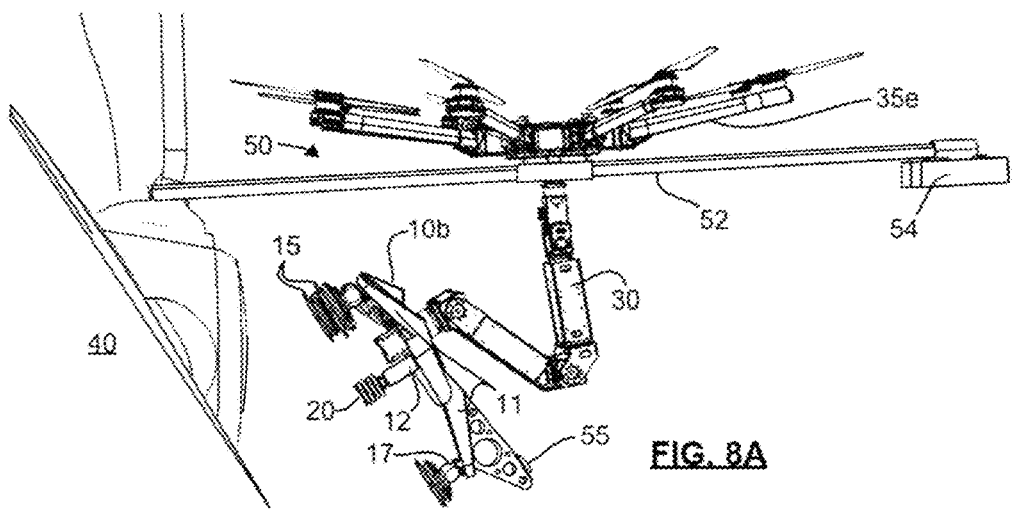
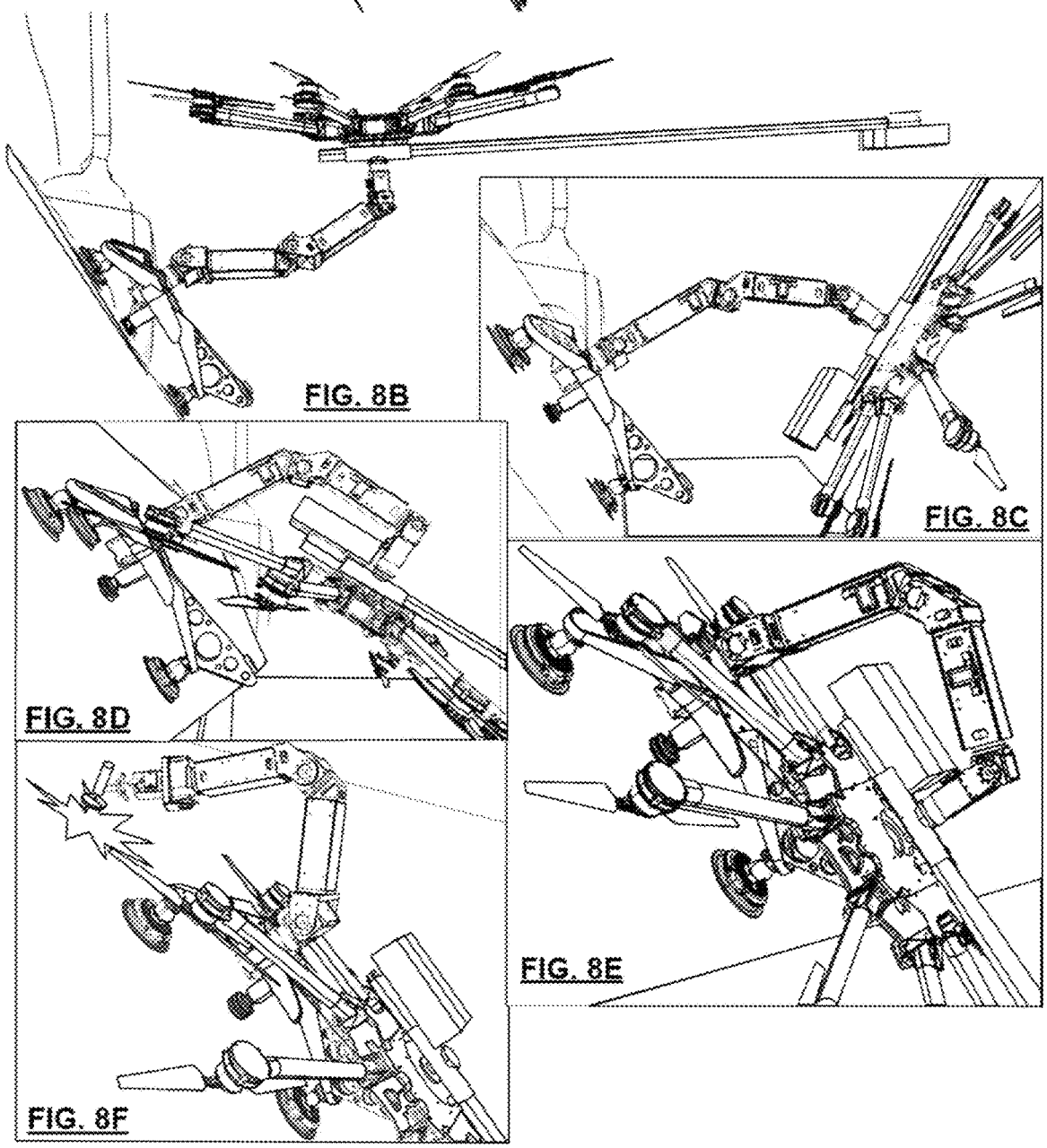

BASE ATTACHMENT MODULE FOR SMALL AERIAL VEHICLES

CROSS-REFERENCE TO RELATED APPLICATIONS

This application is a national phase entry of International Patent Application PCT/IB2019/058921 filed Oct. 18, 2019 which claims the benefit of U.S. Provisional Patent Application No. 62/747,998

FIELD OF THE INVENTION

The present invention relates in general to structures for stable attachment of small aerial vehicles to a work surface, and in particular to a distributed set of contact points and a bellows-type suction cup to increase catch efficiency, and adhesion.

BACKGROUND OF THE INVENTION

Small aerial vehicles (SAVs) are growing to meet the various demands for many dangerous, inconvenient, or difficult tasks that had previously only been performed with operators, rope access technicians, etc. For example, UAVs, such as multi-rotor aerial platforms, are known to have manipulators/robotic arms attached thereto for grasping and operating on work surfaces (see EP2003057 to Goossen, ES2614994, US2016/0323751 to Priest, ES2614994 to Jimenez and WO2017147188 to Culver). There are potentially many applications for robotic UAVs, including to maintain, repair, clean, grind, polish, paint or otherwise coat or weatherproof, caulk, machine, additive manufacture, glue, nail, staple, screw, bolt, or otherwise fasten, resupply a sensor, actuator, battery, consumable, or component thereof, add or remove a component, take surface or depth measurements, apply pressure for contact measurements, for example. Such work can be performed on wind turbines, dams, bridges, walls, buildings, water tanks, platforms, wells, ship hulls, or any other elevated, or otherwise difficult or dangerous to access, structure. To allow for operations on surfaces that apply higher forces on the work surface, requires greater adhesion of the UAV to the work surface, and attention to stiffness of a mechanical structure coupling the attachment to the base of the robotic arm.

Herein "SAV" denotes UAVs and heavier than air flying machines limited to: those capable of hovering (pragmatically defined herein as able to resist gravity without any groundspeed); and those with a total weight (craft plus payload-including any human occupant, or operator-of 10-1000 lbs, more preferably 12-700 lbs, 15-500 lbs, 20-300 lbs, or 25-250 lbs. It is noted that SAVs with total weight of 40-120 lbs, are expected to be deployed fora variety of robotic applications, and can alight on a wide variety of unprepared surfaces. Given the weight requirements, current SAVs typically have electric motor-based propulsion systems, although hybrid motors may be used in other lightweight propulsion systems. It is further expected that new SAV designs will emerge with these capabilities. While UAV is generally understood to exclude human occupants, SAVs may have human payload, who may even be involved in performing, guiding, controlling, or quality assurance of robotic processes, or guiding, or directing the SAV, though possibly not piloting. Typically SAVs are remotely piloted, remotely guided, or fully, partly or semi-autonomous.

Regardless of how the SAV is equipped (with or without robotic joints), or what it is designed for, landing, perching or alighting SAVs onto a work surface in a manner that allows for some measure of adhesion (herein referred to as "attachment") is a challenge. Herein 'work surface', or 'unprepared work surface' is not intended to include a base station for the SAV that has particular mechanical features (clamps, snap-fit mechanisms, or bars recesses, protrusions or posts extending from the base station for anchoring, stabilizing, griping or being grasped or grappled) designed in cooperation with the SAV, but rather denotes a general surface subject to only a few constraints, such as sufficient surface area, limited curvature, and surface texture or roughness known beforehand to be within a range. A work surface may be grounded, may be subject to one or more free degrees of freedom, may be on a stationary or moving vehicle, and may be subject to vibrations or oscillations that would otherwise make attachment difficult. As such the problem of attachment is not addressed by a large variety of patent disclosures such as U.S. Pat. No. 9,527,605 to Gentry, U.S. Pat. Nos. 8,955,801 and 9,434,481 to McGeer, U.S. Pat. No. 7,410,125 to Steele, FR 2923286 to Robert, and U.S. Pat. No. 9,505,493 to Borko which teach landing bases or docks for SAVs, with surfaces having such provisioned mechanical features.

It will be noted however, that a base attachment module (BAM) according to the present invention may itself, once attached to the work surface, serve as a temporary or permanent docking station for similar or dissimilar SAVs, and may therefore incorporate the attachment mechanisms of the prior art, though they are not for mounting to the work surface. Applying higher forces on the work surface or BAM (e.g. wind, docking, robotic processing, or gravitational loads), requires greater adhesion. In general, attachment for robotic processing loads, that reduce compliances caused by low weight SAV structures, calls for attention to stiffnesses of mechanical structures coupling SAVs to the work surface.

While considerable efforts have been made to improve equipment for base or dock landing, there is less evidence of design efforts directed to attachment to surfaces that don't have mechanical features of fixed dimensions for which the SAV is designed to dock or land. While very low mass SAVs (such as UAVs under a few pounds) have a variety of attachment alternatives, such as barbed structures and gecko-inspired dry adhesives, a SAV with enough payload to perform useful robotic operations have limited attachment means. For example, to permit attachment to a wide variety of work surfaces, a single, small suction cup is shown coupling a "mini-drone or micro-drone" to a wall in FIG. 5 of WO 2014/057046. A paper to Hao Jiang entitled: Modeling the Dynamics of Perching with Opposed-Grip Mechanisms (IEEE Int. Conf. on Robotics & Automation (ICRA) 2014 978-1-4799-3685-4/14 3102-8) provides a model of perching with dry adhesive tiles. This paper illustrates some of the difficulties with surface attachment, identifying 3 modes of failure for attachment (p. 3105 C.). Applicant considers the teachings of attachments of SAVs weighing less than one kilogram to be an entirely different problem, because of weight concerns, as well as agility. Some small SAVs use aerial acrobatics for "feet first" landing on surfaces at any orientation that are unavailable for larger SAVs.

U.S. Pat. No. 9,720,519 to Verma teaches a flying user interface with four active suction cups (although the number is apparently immaterial) for gripping the SAV to surfaces. Switches and filters may be used to monitor and control the vacuum system. A FIG. 30 shows a single vacuum suction mechanism in detail, in three states identified as preparation state, sticking state, and drop or separation state. As a strip of 5 positions of a single, disassembled suction cup is visually presented, it is left to the reader to infer that the first and last "states", which appear to be poses, are not yet approaching contact with the surface, the second and fourth states are perhaps the drop or separation state, and the third is a sticking state.

From the machine translation of NL2012975 to Nijenhuis a drone (SAV) equipped with a separable base attachment module having 4 suction cups (n)25 (or alternatively magnets or glue pads) that encircle a tool (n)19 (drill 20 for boring a hole in a window) and a holder are disclosed. A $5^{th}$ suction cup (n)18 is provided for initial contact with the surface. The $5^{th}$ suction cup is designed to contact a window pane while the drone is in horizontal flight. With the $5^{th}$ cup secured, an actuated hinge (n)16 pivots the drone so that the 4 suction cups together make contact with the window.

The distribution of suction cups around a periphery of the drill 20 and nozzle 45 of the holder 28 may provide excellent adhesion and mechanical support. The strategy for contact that involves a first contact between a single (the 5th) suction cup and the surface at a first drone orientation, may be advantageous over controlled multipoint contact strategies where the multiple points must contact at the same time. Furthermore, pivoting the base attachment module coupled only at the $5^{th}$ suction cup, overcomes the agility limits of SAVs mentioned above.

That said, there are some problems with this design. Controlling a drone sufficiently to make contact with the $5^{th}$ suction cup is challenging. If the window surface is not sufficiently normal to the suction cup, regardless of the force and stability with which it is applied to the window, it will not grip. However, a precision of control over angles, velocities, and positions required for the first contact with the $5^{th}$ suction cup may be rather challenging, even in a relatively favourable aerodynamic environment. On approach to a building, flight stability may be more challenging, especially when part of the SAV is in free stream and part in a building's boundary layer. This situation is atypical of flight conditions for which flight control laws are designed. Furthermore, there are substantial risks of rotor collision with the window pane if the SAV bounces and does not stick. Given the risk of bounce of a suction cup as shown, and the unpredictable response of the SAV thereafter, the structure may require many attempts to attach, even in favourable conditions.

WO 2019/109164 to Tavakolikhakaledi et al. teaches a plurality of UAVs used for sensing. In FIGS. 6,9,10,11 base attachment modules are shown having one, or two inline "attaching support structures" such as electromagnetic cores, vacuum cups, or mechanical grippers. The inline structure with two attaching support structures is shown in FIG. 6, and appears to require concurrent coupling. FIG. 7 shows a "detachable sensory module" tethered to a UAV for inspection. The detachable sensory module has an array of attaching support structures, and wheels that allow it to move over the surface. It is not clear how the attaching support structures 703 as shown can be anything other than electromagnets, unless the wheels are retractable. Otherwise the mechanical or vacuum cups can't reach the surface and work as taught.

Accordingly a technique is needed for improving facility of stable attachment of SAVs to work surfaces that have no provisioned mechanical features for mounting. Also base attachment module is needed for higher stiffness SAV attachment for withstanding higher loads such as those resulting from robotic processes.

SUMMARY OF THE INVENTION

Applicant has discovered an improved system for attaching a UAV, possibly with a robotic arm, to a work surface. The system uses a contracting suction cup (CSC) with a surface meeting docking assembly (DA) that cooperate to provide more reliable attachment of a base attachment module (BAM) to the work surface which may be any work surface having a few minimum requirements such as sufficient size, curvatures within a range of minimum radius, and suitable surface roughness. The DA provides a plurality of contact points surrounding the CSC that, when struck by the work surface, tends to correct orientation of the BAM, and increase chances of attachment of the CSC (for a range of approach vectors). The contact points are preferably safely distanced from rotors of the SAV and suited for the contact as bumpers, for example. The CSC provides an initial attachment, and has been found to substantially increase catch of the surface/reduce bounce on contact. Furthermore contraction of the CSC pulls the surface and the DA together so that one or more secondary attachment(s) are brought into engagement with the work surface at a controlled rate, and within a narrow range of angles satisfactory for robust attachment. A high stiffness attachment can thus be reliably attained. The secondary attachment(s), or parts thereof, may provide some or all of the contact points.

Herein a BAM is understood to be a permanent, or removable part of a small aerial vehicle (SAV), or a peripheral device of the SAV. As such the BAM may be a base for the SAV or others, a base for grounding sensors or optical equipment to a stiff structure, or a base for a robotic arm. Of particular interest are BAMs for serving as bases for robotic arms, as very high stiffness BAM attachment can be achieved in comparison with any robotic arm mounted to a SAV away from the base, and reliable attachment can be achieved starting with sealed contact of the CSC. The BAM may therefore have a robot mounted thereto, and may have a perch for holding the SAV once attachment is completed.

A copy of the claims as filed are incorporated herein by reference.

Accordingly, a base attachment module (BAM) for a small aerial vehicle (SAV) is provided. The BAM comprises a rigid body with: a mounting end for holding a SAV; a surface meeting docking assembly (DA) with three or more contact points for contacting a work surface of a given contour, that has no pre-installed mechanical features for mounting to the BAM; and a contracting suction cup (CSC) in a position surrounded by the contact points relative to the contour of the work surface so that: in a fully extended operating position, the CSC extends beyond the contour aligned with three of the contact points; and in a fully contracted operating position, the CSC retracts below the aligned contour. The BAM further comprises a control system for controlling a pressure within the suction cup provided on board the SAV. Electronics and pumps of the control system may be integrated with the SAV, or mounted to the BAM.

The mounting end may comprise one of: a manual, an electromechanical, electromagnetic, hydraulic or pneumatic latching mechanism for holding the SAV to the BAM. The latching mechanism may be responsive to a signal from one of: a local processor of the SAV, a processor of the BAM, and a remote control processor, to open or close.

The DA may comprise a rigid frame with the 3 or more contact points that are distributed symmetrically around the CSC. One or more of the contact points may be on a structure that alone, or in combination, increases adhesion of the DA to the surface. The contour may be planar, cylindrical, or spherical.

The work surface may be concrete-like, and one or more of the contact points consists of a plurality of sharp, stiff, micron-scale spikes adapted to be inserted less than 2 mm into the work surface.

One or more of the contact points may be secondary suction cups, be they: passive suction cups adapted to be de-pressurized only by contact with the work surface provided by action of the CSC, gravity, and/or a mechanical pressure applied by thrust of the SAV; active suction cups adapted to be de-pressurized by a pump produced by the operation of a rotor of the SAV, or by a pressure control system of the SAV, or by the control system; or articulated; flat; cleated, or reinforced suction cups.

Some of the CSC, and suction cups may include a release mechanism for pulling a lip of the suction cup, for releasing adhesion.

The CSC may have a diameter at the open end that is smaller than each of the secondary suction cups.

At least one of the contact points may comprise an adhesion area that increases the adhesion at the contact point within a limited range of orientations of the area with respect to a local normal of the surface contour, and the contact point further comprises a joint or directional compliance for locally reorienting the adhesion area under a contact force, urging the adhesion area toward the local normal. The increased adhesion supplied by the contact points collectively may be greater than the pressure of the CSC, and the CSC may be adapted to be deactivated once attachment is completed.

During retraction, the CSC may passes the plane within an incircle of a triangle with vertices of the three contact points. The incircle may be more than twice a diameter of the CSC.

The contact points may include one or more force applicators that press the surface away from the rigid body, to stress the suction cups and increase a rigidity of the attachment of the BAM to the surface. The CSC may have an actuation depth of at least 120% the diameter at the open end. The CSC may be: a bellows-type suction cup; a bellows-type suction cup with a resilient elastic support; or a suction cup mounted to a mechanism for reciprocating movement.

The secondary suction cups may be active, and commonly actuated, and during retraction of the secondary suction cups, a plurality of tertiary contact points may contact the work surface, to provide a three stage attachment.

The BAM may further comprise a SAV permanently, or temporarily coupled to the mounting end, the SAV rated to carry the BAM, or a robotic arm having a base rigidly coupled to the BAM.

Also accordingly, a method is provided for attaching a SAV by its base assembly module (BAM) to a work surface having no pre-installed mechanical features for attachment. The method comprises: mounting the BAM to the SAV; flying the SAV toward a work surface; on approach to the work surface, directing a surface meeting docking assembly (DA) of the BAM towards the work surface, the DA having three or more contact points for contacting the work surface; making contact between the work surface and a contracting suction cup (CSC) extending beyond, and surrounded by the contact points; and applying suction to the BTCSC to draw the BAM towards the work surface at least until all the contact points of the DA meet the work surface.

The method may further comprise measuring a pressure within the BTCSC while applying suction to determine positive engagement of BTCSC.

Further, a kit is provided comprising a BAM as defined above, and one of the following: a SAV configured to be coupled to the mounting end, the SAV rated to lift the BAM; a robotic arm having a base configured to be rigidly coupled to the BAM; a plurality of replaceable contact points suitable for different work surfaces; and a plurality of replaceable BTCSCs having corresponding actuation depths.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIGS. 4A-D are respectively schematic illustrations of a BAM coupled to: a coaxial helicopter-; tail sitter-; ducted fan-; and tilt rotor-style SAV;

FIGS. 5A-F are respective schematic illustrations showing a sequence of steps in attachment using the embodiment of FIG. 1;

FIGS. 6A-D are respective schematic illustrations showing a sequence of steps in attachment using the embodiment of FIG. 2;

FIGS. 7A,B are schematic illustrations showing two steps in attachment using a variant of the embodiment of FIG. 1 having articulated tertiary DA features;

FIGS. 8A-F are respective schematic illustrations showing a sequence of steps in BAM attachment, SAV perching, and robotic processing with a multirotor SAV RBAM;

DESCRIPTION OF PREFERRED EMBODIMENTS

Herein a Base Attachment Module (BAM) for a Small Aerial Vehicle (SAV) capable of hovering is described for improved facility of high stability attachment.

Figure 1A:
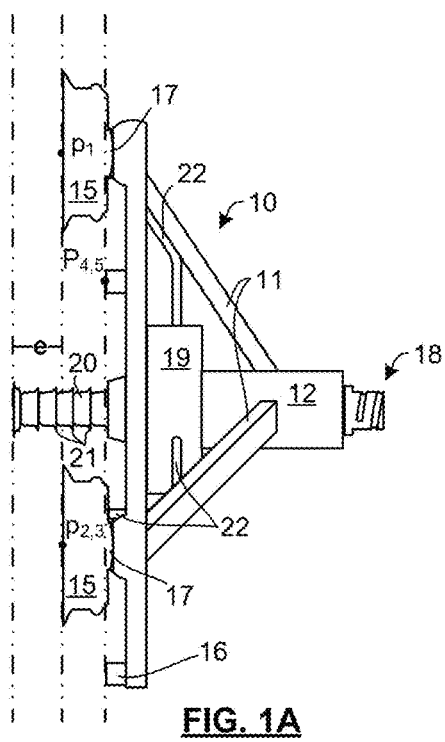
FIGS. 1A,B are schematic side and front views of a first embodiment of a base assembly module (BAM) in accordance with the present invention, featuring a surface meeting docking assembly (DA) with suction cups mounted on ball joints.
Figure 1B:
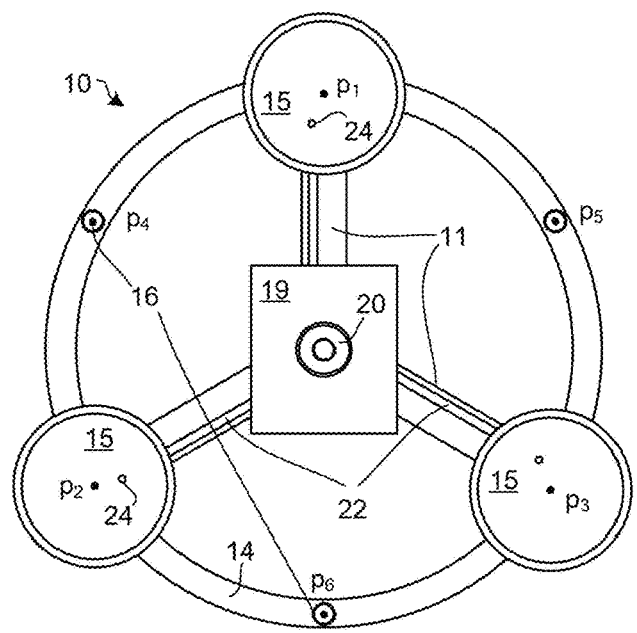

FIG. 1 shows a BAM 10 in accordance with a first embodiment of the present invention. BAM 10 is understood to be a peripheral device of a SAV, and is built and designed accordingly. The BAM 10 may also be a base for a robotic arm, or otherwise be subject to substantial loads, for example: during docking of a heavier SAV, or a rapidly decelerating SAV; for mechanisms subject to wind load or other forces that require high stiffness support; or sensors and devices that are sensitive to vibration, such as laser-based devices, or other optical devices that are to be secured to the work surface for improved reliability of measurements or readings. The BAM 10 may be designed, as shown, for mounting to a relatively flat work surface, which may be horizontal, vertical, or at any angle therebetween for example having a work surface with a macroscopic average radius of curvature greater than 10 times a mean separation of contact points for attachment to the surface, or alternatively can have any other contour. For simplicity of reference and illustration, the contour (a coarse geometric surface matching the work surface for which the BAM is designed) is assumed to be a flat surface, but it is understood that a variety of contours could be intended for different applications, such as cylindrical or spherical contours of fixed radius. To dock to a vertical cylindrical wall or column of radius between 30 cm and 3 m is a fairly common structure. It is also noted that smooth bi-curved surfaces of aerodynamic structures are work surfaces for which any BAM of the present invention can be adapted with minor alteration.

BAM 10 has a rigid body with a frame consisting of wye spokes 11 extending from a hub 12, and a peripheral ring 14 that support a plurality of contact points $p_x$ for contacting the intended work surface, although other frames, plates and structures could be preferred for particular applications and work surfaces. Herein, to reduce a visual complexity of the drawings, when a plurality of instances of a structural feature are identified with a reference number, only a representative number thereof are identified in the drawings, however all of the features are intended by the reference number.

Three of the contact points ($p_{1,2,3}$) are identified as a centre of a top lip of three suction cups 15. It will be appreciated by those of skill in the art that each point on the rim of each cup 15 is technically a contact point, as opposed to the centre, however it is convenient to refer to all contact points on the rim by a single centre point, given that each cup 15 is mounted to the frame by a respective effective ball-joint 17 and accordingly the rim may vary somewhat before contact with a work surface (not shown) orients them appropriately. Another 3 contact points ($p_{4,5,6}$) are identified as top centres of bumpers 16. As the BAM 10 is designed for meeting a substantially flat surface, the contact points $p_{1,2,3}$ and $p_{4,5,6}$ define two planes parallel to the nominal ground, with the plane of the bumpers 16 recessed with respect to that of the cups 15.

It will be appreciated that a trade-off between pliability and suppleness of the cups 15, elasticity/stiffness of the bonding, and longevity of the cup, can be chosen for different attachment problems. Furthermore, a tack or solid adhesive property of the material may be chosen with respect to an intended work surface (or variety of work surfaces). Furthermore a viscous liquid coating for the cup may be applied prior to departure, or may be expressed into the cup, onto a lip of the cup, or onto the surface, with a supply system, if adhesion to a widest range of work surfaces is required. Furthermore, the cups may have spines, grapples or other spikes to penetrate into the work surface.

In alternative embodiments, especially those that call for a permanent attachment of the BAM to a work surface, the contact points may be on attachment structures other than suction cups, or a settable polymer composition or epoxy may be excreted to surround the attachment structure (or otherwise cement between the frame and the work surface) to permanently adhere the BAM 10 to the work surface.

The hub 12 provides a SAV mounting end 18, schematically illustrated as a pin threaded coupler, although a full range of known mechanized couplings, including electromechanical latches and releasable snap fit connections can alternatively be used. If the BAM includes a robotic arm, the robotic arm may be positioned to mechanically couple and decouple the SAV (not illustrated) to the BAM 10. While the hub 12 shows a mounting end 18, it will be appreciated that the BAM may be permanently secured to the SAV.

As such the frame, and primary (and optionally secondary) contact points provides a docking assembly (DA) for meeting a work surface that is capable of a high attachment force, however the DA can only reliably attach if it meets the surface at a relatively narrow range of angles of incidence (pitch and yaw), and at a speed that allows for suitable contact to be made at the cups while suction is applied. If it is important that all of the cups engage (for stiffness), this can be a challenging process to mechanize.

The hub 12 houses a pressure manifold and control system 19, which supports a contracting suction cup (CSC). The illustrated CSC is a bellows-type suction cup (BTCSC) 20 that has a plurality of folds 21 that collapse in a contracted state, to permit efficient evacuation. Like all CSCs according to the present invention the BTCSC provides a significant contraction (i.e. >25% of a diameter of the BTCSC), and a sufficient force to draw the SAV, payload, and BAM 10 toward the work surface. BTCSCs are known in the art providing a range of pressure ratings, contraction lengths, and diameters. While a regular arrangement of uniformly spaced folds 21 are illustrated, alternative BTCSCs may have fewer or more folding creases or folding areas. While the BTCSC may be a monolithically formed elastomeric body with folds created therein, longer contraction length BTCSCs may require stiffeners, such as interior or exterior supports, or telescopic, lever-action or otherwise reciprocating mountings. For example the CSC may also be provided by a suction cup lip mounted to a reciprocating piston formed of material that is not supple or elastomeric, providing a long contraction length and sufficient actuation force.

The BAM 10 provides the suction cups 15 that together are controlled via control lines 22 by control system 19, which extend to ports 24 of the cups 15 and of the BTCSC 20 (not in view). While the control system 19 is shown as an electronics package mounted to the hub 12, in alternative embodiments the control system 19 may be fully integrated with the SAV. For example, if the BAM 10 is designed to permanently attach to the work surface, and to separate from the SAV (e.g. to provide a docking base), the BAM 10 may be an autonomous system with a power supply and pump for controlling pressure on pressure control lines communicating with cups 15 and the BTCSC 20, and any other actuator of the BAM. If the SAV is designed to separate from the BAM, and fly away, and the BAM is used to dock with the SAV, or any other vehicle or device, the control system 19 preferably has a wireless communication chip set, and power supply therefor, which can be used for helping guidance of the SAV, vehicle or device to the dock.

The BAM may be a tethered system with a supply of pressurized fluid and preferably also electricity. If the tethered BAM has a separable SAV, the tethering may be directly between a base station and the BAM, without coupling to the SAV. If so the control system 19 has electronics for controlling and powering flow control equipment or pneumatic or hydraulic equipment, to operate the BAM and its functionality, but no pump is needed. Lightweight relatively high pressure pneumatic and hydraulic control lines can be used, such as a Flexeel™ Air Hose.

The combination of the cups 15 dispersed around a periphery of the BAM 10 is a particularly good arrangement for stable mounting. The control system 19 may include one or more pumps, and one or more valves for selectively actuating respective cups 15 and BTCSC 20, or groups thereof. No on-board powered pump is required if valves are used to couple an external pressurized fluid supply to the BAM, and a simply controlled manifold may be sufficient. Specifically, a Venturi pump is a low-weight structure with no moving parts and no electrical supply (apart from valves which may be optional). The Venturi pump, on-board the BAM, can advantageously be provided with a positive pressure source, such as a hydraulic or pneumatic hose. Alternatively, powered pumps may be carried by the BAM, such as positive displacement pumps, Venturi-type pumps, moving airfoil type pumps, or other mechanical flow pumps. If a Venturi-type or moving airfoil pump is used, the power supply may be provided by a rotor(s) of the SAV.

During attachment, the BAM 10 will be maneuvered towards a suitably flat work surface with the DA carrying additional, possibly higher pressure/stability attachments for the BAM 10, but that are only effective if the cups 15 are brought into contact with the work surface at a specific range of angles and speeds and forces. This is accomplished by depressurization of the BTCSC 20. As shown best in FIG. 1A, the lip of the BTCSC 20 in fully extended pose, is a distance e closer to the work surface contour (plane) than the cup contact points, to ensure that the BTCSC 20 can make sealed contact with the work surface first. The distance e should be at least 5% of a mean separation of the 3 contact points, more preferably at least 10 or 15% the mean separation, and should also be at least 50% a diameter of the BTCSC 20. Any contact with the cup contact points, or bumpers 16 will tend to reorient the BAM 10 to improve alignment of the BTCSC 20 with the work surface (if the work surface contour is suitable). The cup contact points, given their ball joint mountings 17, may also generally be favourably reoriented by preliminary contact.

While the bumpers 16 do not have any function once the BAM 10 is attached, unless they are part of the attachment of the DA, they may have been useful during approach, as a means of reorienting the BAM on approach to the surface, and may serve a similar purpose during retraction of the BTCSC 20. One or more of the bumpers 16 may be part of the attachment of the DA, if it rests in contact between the BAM and work surface once attachment is made. Depending on a variability of the work surfaces from the contour, it may not be determined initially whether the bumpers 16 are part of the attachment or not. In some embodiments, the contour may be a high accuracy map of the work surface, and more and stiffer bumpers 16 can be used to establish better contact for the DA.

Figure 2B:
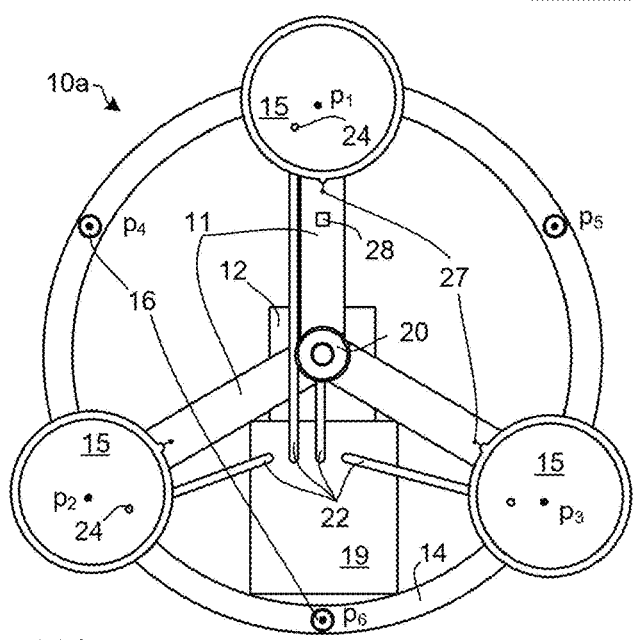
FIGS. 2A,B are schematic side and front views of a second embodiment of a BAM in accordance with the present invention, featuring a surface meeting docking assembly (DA) with U-joint SAV mounting.
Figure 2A:
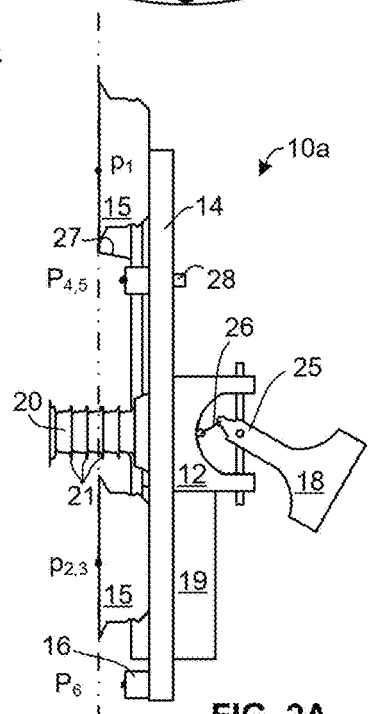

FIG. 2 schematically illustrates a second embodiment of a BAM (10a) in accordance with the present invention. Herein use of the same reference numerals in different figures identify similar parts with like function. Descriptions of the features are not generally repeated for each drawing, except to indicate how they may vary. The BAM 10a is similar in structure to BAM 10, as the frame includes a hub 12, wye spokes 11, and peripheral ring 14 for supporting a surface meeting docking assembly (DA); however in the embodiment of FIG. 2, a flatter BAM is provided, and the wye spokes 11 are in a common plane with the peripheral ring 14. To further decrease a profile of the BAM 10a, the pressure manifold and control system 19 is mounted beside the hub 12. This generally decreases a clearance of the BAM 10a as it approaches the work surface, which limits a range of work surfaces to which the BAM 10a can attach, and a range of angles of attack, but may reduce aerodynamic resistance and envelope of the BAM 10a.

The suction cups 15 of BAM 10a are not ball-mounted, and therefore have only a compliance associated with the elastomeric body of which it is composed to adapt to the work surface. As such, BAM 10a is particularly well suited to mounting to surfaces having higher minimum radii of curvature (flatter) at the macroscopic scale, but also may serve rougher surfaces as the compliance of the cups is higher. To improve group orientation of the cups 15, a U-jointed (25) SAV mounting 18 is provided. The U-joint 25 is shown with two orthogonal axles, each pivotally mounted to respective ends of the U-joint. As the U-joint is passive, a resilient member 26 is shown to bias the hinges in a preferred orientation with respect to the SAV mounting 18, which would otherwise assume whatever orientation gravity compels. It will be noted that the SAV mounting 18 is of a different connection type than in BAM 10.

BAM 10a further includes a set of release mechanism comprising tension lines 27 mounted to a lip of the suction cups 15. The tension lines 27 extend through wye spokes 11 to ensure that tension on the lines pulls the suction cups 15 substantially perpendicular to the plane/contour. The tension lines 27 are drawn along the back side of the spokes 11 and meet a common rotary spindle 28 that is adapted to actuate the tension lines 27 in unison. Such a cup release mechanism is not required in all systems and depends on surface tack and adhesion of the cups 15 to the work surface.

Figure 3:
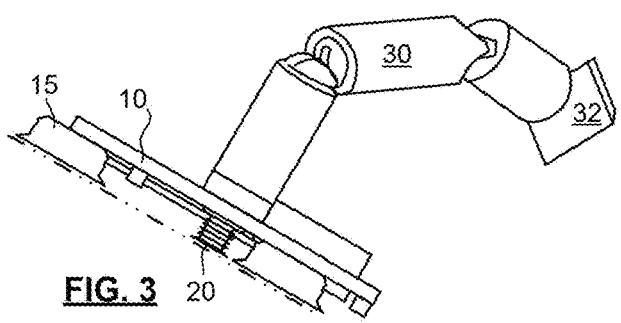
FIG. 3 is a schematic side views of a third embodiment of a robotic BAM (RBAM) in accordance with the present invention, coupled to a robotic arm.

A robotic arm 30 may be affixed permanently, semi-permanently, or removably to a BAM of the present invention, and may communicate between the BAM and SAV in some embodiments. FIG. 3 is a schematic side view of BAM 10a coupled to a robotic arm 30. The robotic arm 30 may have any end effector or tool tip 32 for operating on, or from, the work surface. FIG. 3 also shows the BTCSC 20 and the suction cups 15 in a retracted pose relative to the contour (plane), as if in contact with a work surface.

FIGS. 4 and 8 illustrate a variety of SAVs that can be equipped to hover. While these examples are intended to show a variety of SAVs common today, there are a wider variety of vehicles having some features of groups of these SAVs. For use in the present invention, it is necessary that the SAV be capable of hovering, and have a total weight with payload supportable by the surface via the DA.

FIG. 4A illustrates, in side view, BAM 10 held via a robotic arm 30 to a co-axial counter-rotating helicopter 35a. In a SAV of the present invention, there may be two co-axial counter-rotating blades. It is conventional for SAVs to have a plurality of rotary blades, and for pairs of the blades to rotate in opposite directions to reduce torques: when the blades are paired on a single axis, torques are further reduced. FIG. 4B is a side view of BAM 10 coupled to a tail sitter-style SAV 35b. A tail-sitter has advantages of both a helicopter (in terms of vertical take-off and landing, and hover), as well as advantages of a fixed-wing aircraft in terms of fuel efficiency and range. On the tail-sitter, the BAM 10 is provided on the tail, and is designed for attachment to horizontal work surfaces. The BAM may alternatively be built-in to the tail, with the wye spokes 11 and hub forming aerodynamic stabilizing bodies that reduce drag in comparison with the schematically illustrated drawing. FIG. 4C is a top plan view of a ducted fan-style SAV 35c. These SAVs have very little body and structure relative to their propulsion system, and accordingly can offer substantial payload around a periphery thereof, to avoid interaction with the airflow through the duct. The BAM 10 and a robotic arm 30 are shown on one side of the SAV 35c, with the robotic arm 30 in a closed pose. It will be appreciated that robotic arms may be designed to collapse to a small shape for transport. The BAM 10 has an attachment for both the robotic arm 30 and for the SAV 35c, at the SAV mounting end. One advantage of this arrangement is that the robotic arm may be able to manipulate or reorient the DA as a whole, individual suction cups thereof, and/or may grip, disconnect, and manipulate the SAV after attachment of the BAM. FIG. 4D schematically illustrates a bottom view of a tilt rotor SAV 35d, which has two pairs of tilting rotors to which it is mounted. The SAV 35d is shown in a hover/landing pose with both rotor pairs oriented vertically. The SAV 35d is shown equipped with a BAM 10b with 3 wye spokes 11, each terminating with a suction cup 15, and joining at a hub 12, with the hub 12 supporting a BTCSC 20. BAM 10b does not have a peripheral ring 14, and is mounted by retractable landing gear from an inside space of the SAV 35d, for improved aerodynamics during transport. The landing gear may be part of a robotic arm 30 not in view. Advantages of tilt rotor style SAVs are similar to those of the tail sitters, however the tilt-rotors tend to have improved stability for hovering, having more flight control surfaces in landing/hovering mode.

FIGS. 5A-F are respective schematic illustrations showing a sequence of time points in attachment using the embodiment of FIG. 1. Initially, in time point 5A, a SAV (not shown) approaches a work surface 40 at low speed, in hover mode, with the DA facing towards the work surface 40. The BTCSC 20 is in a fully extended pose, and depressurization is applied to (at least) the BTCSC 20. The SAV continues it's approach to the work surface 40, or stabilizes flight and actuates a robotic arm (30) to effect the BAM 10 approach. At time point 5B, a suction cup 15 is shown striking the work surface 40 first, as the BTCSC 20 is about to make contact with the work surface 20, however it will be appreciated that with limited control and complicated surfaces, either the BTCSC 20, or any one of the cups 15 could alternatively have contacted the surface 20 first, with the BTCSC 20 slightly more likely. The struck cup 15 pivots on its ball joint, and tilts the BAM 10 and SAV to improve orientation with respect to the work surface 40, as shown in time points 5B,C. Regardless of which cup 15 strikes first, it will generally improve the orientation, unless the work surface has a contour that does not coarsely match the arrangements of the contact points of the DA. By time point 5C, suction engagement of the BTCSC 20 is complete and continued depressurization leads to a drawing of the BAM 10 and work surface 40 together. The approach of the BAM 10 by the SAV or robotic arm may continue throughout this time point, or, if the suction engagement is strong enough, the BAM advance from the SAV or robotic arm may be stopped or slowed. If the SAV was in a position control mode, continuously adjusting flight control surfaces to maintain a position that is exact enough that the SAV would fight the suction cup, the SAV may change to a hover mode.

Time point 5D shows the contraction of the BTCSC 20 has begun and all suction cups 15 are being oriented for attachment by meeting the work surface 40. The orientation of the BAM 10 continues to change throughout the contraction of the BTCSC 20. At time point 5D, one of the bumpers 16 engages the surface. The bumpers 16 may improve distribution of the pressure on the suction cups 15, improve orientation of the BAM 10, and reduce risk of folding or bending the suction cups during the contraction. The suction cups 15 may have been actuated since the beginning, or at least since suction engagement at time point 5C, or may be delayed until the suction engagement of BTCSC 20 completes it's motion, depending on the control sequence. The actuated suction cups 15, as shown at time point 5E, are drawing the BAM 10 and work surface 40 together to form a robust high-stiffness attachment, which is completed by time point 5F, where all suction cups 15, and, as shown, the bumpers 16 are all making contact with the work surface 40, which may or may not be optimal for the BAM attachment, and may be subject to a desired BAM match to the work surface 40.

FIGS. 6A-D are respective schematic illustrations showing a sequence of time points in attachment using the BAM 10 embodiment of FIG. 2. Time point 6A shows the BAM 10a with the BTCSC 20 beginning to make contact with the work surface 40, with suction activated. While time point 6A shows a sequence that happens to involve first contact by the BTCSC 20, this does not imply that the BAM 10a requires a higher accuracy and control over approach: if one of the suction cups 15 had first struck the surface, it would have deflected the BAM 10a similarly to the sequence of FIG. 5A-F.

By time point 6B the BTCSC 20 has a suction contact with the surface 40, and the draw of the BTCSC 20 begins. By time point 6C it happens that 2 of the cups 15 have met the surface 40. The individual cups 15 are rigidly coupled to the BAM 10a, and so contact tends to improve orientation by tilting at the U-joint 25, sufficient to overbear the bias applied by resilient member 26.

The cups 15 are shown very pliable, which is convenient for high suction force application. With more supple cup material, deformation is easier, and sealing is improved, however, the suppleness tends to decrease a stiffness of the attachment. To improve stiffness, the bumpers 16 can be relied upon for stiffening the contact. The bumpers 16 can be provided externally, as shown, or can also be within the suction cup.

Time point 6D shows the completed attachment with the suction cups 15 fully actuated, and at least one of the bumpers 16 rigidly coupling the BAM and the surface 40.

FIGS. 7A,B schematically illustrate an attachment process, using a variant of the embodiment of FIG. 1. The bumper 16 of the DA are modified to be actuable bumpers 16', which are driven by movers 16a. The movers 16a may be used to stress or test the cups 15, or improve stiffness of the attachment, and may be used for decoupling the BAM 10, in certain embodiments. The attachment process involves following the process of FIGS. 5A-F with the bumpers 16' retracted, followed by extension of the bumpers 16'. Preferably the extension applies a same force at each point, and a degree of extension may be measured to improve control over attachment. A test may involve increasing or decreasing suction to the cups 15 or BTCSC 20, while maintaining the constant force, and measuring change in the degree of extension; or varying the force applied by the bumpers 16' (in series if possible), and monitoring pressure changes in the suction cups. The movers 16a may be squiggle motors, or low weight, moderate force drivers, or may be a spring with a stop, and a latch that can be released to extend the bumper.

FIGS. 8A-F are respective schematic illustrations showing a sequence of time points in attachment, and docking of a SAV 35e to a work surface 40, which happens to be in the form of a blade of a rotary turbine. The SAV 35e is a multi-rotor coptor with a BAM 10b connected via a robotic arm 30, and has a counterbalancing system 50 with an articulated rod 52 with a battery 54 (although any other weight may be used, such as sensors or additional equipment required for a specific operation). Unlike BAMs 10,10a, BAM 10b has a frame consisting only of wye spokes 11 and hub 12: no peripheral ring is used, and no bumpers or tertiary contact points are provided, except if within the suction cups 15. At time point 8A, the SAV 35e approaches the blade surface 40. The counterbalancing system 50 operates while the robotic arm 30 is moved into position at the surface, to avoid changes in centre of gravity of the system. By time point 8B, contact is made at the BTCSC 20, and suction is applied to draw the suction cups 15 into firm contact. The suction cups 15 are depressurized and the BAM 10b is attached.

In some embodiments of the present invention, the BAM includes a perch for holding the SAV 35e in a powered down state. Preferably this is performed by a robotic arm mounted, or mountable to the BAM. If the robotic arm is mounted between the BAM and SAV 35e, as in FIG. 8, the robotic arm may be liberated of the SAV by mounting it to its perch. The BAM 10b has a perch 55 at one extremity of one of the wye spokes 11. Time points 8C-E illustrate an example of perching a SAV, that has been powered down, following BAM 10b attachment. While the counterbalancing system 50 is shown as part of the SAV 35e, in other embodiments it can equally be part of the robotic arm, or the BAM. A length of the robotic arm necessary for perching the SAV 35e by flipping the SAV 35e as shown may be convenient of the robotic process calls for a similar envelope. Alternatively the counterbalancing system's 50 articulated rod 52 can be used to push the SAV 35e far enough away from the BAM 10 with a coupling of the battery pack 54 to the BAM 10b.

Once the SAV is perched, the robotic arm decouples from the SAV, and may connect a tool or end effector that is either on the BAM, SAV, or in the work space. Time point 8F shows the robotic arm with such a tool to process the work surface locally.

Figure 9A:
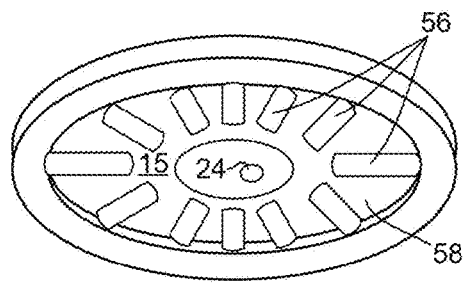
FIG. 9A is a schematic illustration of a suction cup with cleats for rigid connection of a top plate thereof to an attachment surface useful in the DA.

FIG. 9A is a schematic illustration of a cavity side of a suction cup 15 with cleats or bumpers 56 (only three identified) for rigid connection of a top plate 58 thereof to an attachment surface, to improve attachment stability and stiffness. Such suction cups are commercially available.

Figure 9B:
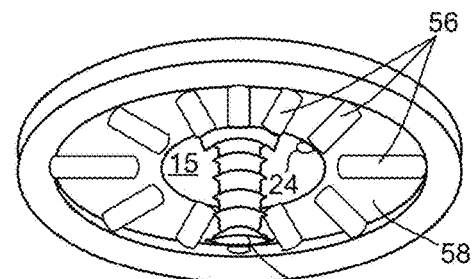
FIG. 9B is a schematic illustration of a suction cup of FIG. 9A with a CSC suitable to act as a BAM for a range of attachment surfaces, when equipped with a suction system and SAV attachment.

FIG. 9B is a schematic illustration of a suction cup of FIG. 9A with a BTCSC 20 embedded therein. The hybrid cup 15/20 preferably has two supply lines, or a switch, for depressurization of the BTCSC 20, or both the BTCSC 20 and cup 15 in series or in tandem. This hybrid cup 15/20 can be produced by cutting a hole in a commercially available cup 15, inserting and sealing an end of the BTCSC 20; and providing pressurized supply lines to both the BTCSC and cup. As such the hybrid cup 15/20 with a suitable mounting end 18 can provide the BAM.

Similarly, replacing the 3 suction cups 15 of FIGS. 1,2 with a single rubber shroud surrounding the frame, and enclosing the BAM, with a suitable suction cup lip formed of the material, can equally provide an operable BAM for attachment to some range of work surface contours. The suction cup can also be an annular shape backed by, and extending around, the peripheral ring 14 of the BAMs 10,10a.

Figure 9C:
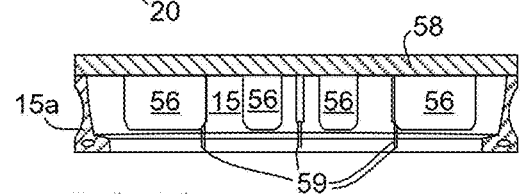
FIG. 9C is a schematic illustration of a suction cup of FIG. 9A with a plurality of barbed penetrating structures for increasing adhesion, especially for attachment to porous or penetrable work surfaces.

FIG. 9C schematically illustrates a cross-section of a barbed suction cup 15, with a plurality of the bumpers 56, as well as a collection (3 shown, one fully in view, although in most applications a large number would be used) of barbs 59 (two shown per mounting, although different numbers can equally be used.) Barbed suction cups may be particularly useful for porous or easily penetrable materials, may increase shear stiffness of the attachment to some materials, may allow for a more durable attachment with less depressurization or even under no persistent depressurization and may reduce a weight cost of attachment. It is known to use stiff, very fine, wires to form such barbs for lighter weight SAVs. A stand-off between the top of the bumpers 56 and distal tips of the barbs 59 can be used to control an insertion depth, or the mountings can be mounted for reciprocation. If the mountings are adapted to move radially inwardly (or in any other motion of the plane) after insertion, and then locked into a pinched position, further attachment of the surface may be provided. A wall 15a of the suction cup is shown schematically in profile, and includes a stiffening ring around the lip.

Figure 10A:
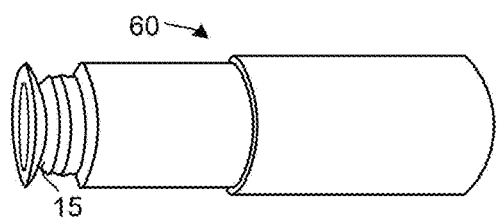
FIG. 10A is a schematic illustration of a telescopically mounted contracting suction cup that can be used instead of bellows-type suction cups.

FIG. 10A is a schematic illustration of a telescopically mounted, actuable suction cup 15 that can serve as a CSC. A telescopic mounting 60 comprises two coaxial cylindrical members that may be actuable by a motor, or may be designed for a single actuation of a biased spring, for example, especially if a robotic arm, other actuator, or the SAV can be controlled to draw the surface and the BAM together. A motor that is actuable with the depressurization of the CSC is preferred so that the drawing together of the BAM and surface can be effected with a fewest motors and least weight. While a telescoping joint is shown, other reciprocating structures, such as lever arms, and other sliding joints are substitutable.

Figure 10B:
FIG. 10B is a schematic illustration of a bellows-type suction cup having a spring support for facilitating a longer extension range.

FIG. 10B is a schematic illustration of a BTCSC 20 with an external spring biasing member 61 surrounding the BTCSC 20 to improve stability and range of a soft BTCSC 20 body. It will be appreciated that the spring could alternatively be on an inside of the BTCSC 20, and that springs both inside and outside the BTCSC 20 cavity can be used, for example with different nominal spring positions to counteract each other at some states of extension. While a helical spring is illustrated, and is convenient for it's stiffness map, other springs, including a plurality of leaf springs surrounding the edge, coil springs, and other resilient members can be used to increase support for BTCSCs in use.

A mechanism to release the spring when the BAM approaches a surface, and grips the BTCSC when retracted may further be advantageous for promoting an initial catch of the BAM.

EXAMPLES

Applicant has demonstrated the present invention with prototypes designed and built in house. Two versions have been built using 3D printed structures and assembled to form wye frames, with a BTCSC at a hub of the frame and cups at the ends. Photographs showing the prototypes and allowing visual appreciation that the prototypes were made and tested are provided in the publication of this application in the international phase as WO 2020079668. A first generation (1g-) BAM adhered to a vertical wall with a suspended 2001b weight, demonstrating stiffness of the BAM attachment useful for a variety of robotic operations. A second generation (2g-) BAM was tested to demonstrate improved catch, and reduced bounce, of the 2g-BAM when the CSC is used. A third prototype was provided with a lip pull device integrated with the BTCSC, which substantially improves release of the BTCSC for detachment. A tethered BAM was designed for attaching to rough surfaces, using a modification of the 1g-BAM with foam suction cups adhered to a rough engineered surface, a painted stippled surface, and an outdoor porous concrete surface.

The first generation of the BAM prototype adhered to a vertical wall, and suspended a 200lb weight. The prototype (1g-BAM) was designed with a two-piece hub structure, three radial arms extending from the hub generally in a plane. Each piece was formed with a 3D printer, and bolted together. A hollow aluminum rod, at a flared end thereof, was bolted to a centre of the BAM, oriented perpendicular to the plane. Two of the 3 contact points were separated by 430 mm, and the third separation was 365 mm, and thus a mean separation was about 408 mm. The mean separation is about 10 times a tip diameter of the CSC, and it preferably at least 3 time the tip diameter. The centre of the CSC is 240 mm from each contact point. An Anver B2.5-42 bellows suction cup was mounted to the hub opposite the rod, and at the contact points one ends of each arm, a suction cup (Piab F110) was attached. Flexible tubing was used to couple each suction cup to two parallel vacuum pumps (model AIRPON D2028, 12V, 12-15 liter per minute at free flow, vacuum range 16" hg, 300 g (0.66 lbs)) via a set of manual valves. The valves were used to test vacuum being sent to valves in different orders. The weight of the 1g-BAM (the pumps, valves, tubes, etc. were not mounted) was 6.3 lbs.

Each Piab F110 suction cup includes a rigid structure of internal "cleats" that allow for increased stability and improved traction/friction when forces and torques are exerted in a direction parallel to the suction cup's plane, and are advantageous for increasing stiffness of the attachment. The rated maximum vertical movement is 4 mm.

The Anver B2.5-42 bellows suction cup has the following rated properties: a load capacity of 1.8 Kg, a volume of 19.5 cm$^3$, a tip diameter of 43 mm, and an actuation depth of (46-24=) 22 mm. Thus the actuation depth is just over 50% of the tip diameter, and may be up to 3 times this ratio.

This prototype was not weight-optimized, and rudimentary manual pneumatic circuits afforded limited testing sequences, but the 1g-BAM was tested to assess what kind of attachment forces can be produced. Testing of the first prototype involved testing lifting force allowance. For this test, 1g-BAM was mounted on a flat, vertical, painted dry-walled surface. Suction was applied to all suction cups, and a 200 lb weight was suspended from the BAM. The load was tested for more than 45 minutes, without degradation. It is believed that attachment would last as long as suction is applied. A 200 lb force was deemed sufficient and it was decided not to test higher load to avoid possible damage. A 200 lb suspended load corresponds to a safety factor of 5, assuming the SAV has a total weight of 40 lb. Stiffness of attachment by the BAM is shown to be sufficient for a variety of robotic operations.

A second round of testing was performed on 1g-BAM using an industrial robot to position a metal plate at an angle, as shown in the following picture. The BAM was suspended under a short string, and tests were done to see if the BAM would catch the surface or not when let go to contact the surface like a pendulum. The experiments showed that the chances of surface attachment was markedly higher when the central BTCSC was provided, versus when it was not, though the trials were not recorded.

As a result of this test, Applicant developed a second generation 2g-BAM with a view to leveraging a central bellows type suction cup to: increase chances of catching the surface during BAM docking to an unprepared surface; and utilize the bellows type suction cup to pull the BAM towards the surface and press each surrounding suction cups (or other contact points) against the surface, to ensure robust attachment.

The second generation BAM prototype has these additional features. The three surrounding suction cups remain the Piab F110. The central bellows type suction cup used is the larger B2.5-88-SIT bellows suction cup, silicone, group 3. Compared to the BTCSC used on 1g, the B2.5-88 has an increased diameter (88 mm) for increased force, as well as range of 44 mm (83-39 mm). The rated load capacity is 6 times that of the B2.5-42. An in-plane off-set depth of the BTCSC is adjustable to vary a minimum radius of curvature of the BAM (to permit matching of a contour of work surfaces having different dimensions).

Some efforts were made to improve strength to weight ratio of the parts of the 3D printed structure for the 2g design. The 2g-BAM has 4 independent pneumatic circuits. For each circuit, there is one suction cup, one lightweight pump, a pressure sensor, air filters and a release valve. The lightweight pumps (PARKER model E129-12-120, 12V, 2.5 liter per minute at free flow, vacuum range 20" hg, 50 g (0.11 lbs)) were connected directly on each suction cup. An on-board micro Arduino controller is provided to automate a sequence including pressure thresholds and timings to activate pumps or release vacuum depending on configurable conditions.

A respective low weight, limited range, effective ball joint (~25° pitch and yaw and ~20° roll) couples each the 3 surrounding suction cups to the BAM to accommodate deviation from a planned contour for the work surface. An estimated minimum radius of curvature required of a work surface for attachment is 1 m, although other suction cups could alternatively be used to increase the range of work surfaces to those having a minimum radius of 0.5 m. A Pan-Tilt pivot is provided on the back of the BAM to allow manual pre-set orientation relative to a SAV. Colored LEDs were included to visually indicate status' of each pneumatic circuit (Pump active or not, vacuum value and status of the module) as these were useful for testing.

The 2g-BAM prototype was tested by suspending the BAM by a tensile line (78"), raising the BAM at an angle, and letting the BAM impact the vertical wall like a free pendulum. The initial angle of the pendulum was measured using a smart phone app. The 2g-BAM was released at angles of 7.5 and 15 degrees relative to the vertical wall, resulting in impact speeds of 0.58 and 1.15 m/s as per energy conservation principle (Speed=$(2*g*L(1-\cos(\text{angle})))^{1/2}$).

This test is believed to be reasonably representative of a SAV contacting a vertical surface. It is believed that the main variability in this test is the fact that the position and orientation at which the BAM is let go is not overly precise (set manually by hand), and consequently, the different trials resulted in different outcomes. Variability in the initial angles and orientations resulted in different impact dynamics (which cup contacts the surface first, at what angle, the corresponding rebound, etc.) though the variability is not monitored.

Table 1 lists the results of the tests performed on the system without the central bellows suction cup.

Central Bellows suction cup removed Table 1:

| Test number | Speed (m/s) | # suction cups in place | All 3 suction cups |
|---|---|---|---|
| 1 | .58 | 1 | no |
| 2 | .58 | 0 | no |
| 3 | .58 | 0 | no |
| 4 | .58 | 1 | no |
| 5 | .58 | 1 | no |
| 6 | 1.15 | 1 | no |
| 7 | 1.15 | 2 | no |
| 8 | 1.15 | 1 | no |
| 9 | 1.15 | 0 | no |
| 10 | 1.15 | 1 | no |

If no CSC was used, none of the 10 trials resulted in docking of all three suction cups. A small, but statistically relevant, improvement in number of surrounding suction cups engaged, is obtained with increased speed of contact.

Table 2 lists the results of the tests performed with the system with the central BTCSC.

With central BTCSC Table 2:

| Test number | Speed (m/s) | All 3 suction cups (yes-no) |
|---|---|---|
| 1 | .58 | yes |
| 2 | .58 | yes |
| 3 | .58 | yes |
| 4 | .58 | yes |
| 5 | .58 | yes |
| 6 | 1.15 | yes |
| 7 | 1.15 | yes |
| 8 | 1.15 | yes |
| 9 | 1.15 | yes |
| 10 | 1.15 | yes |

These tests show that a substantial improvement is provided if an articulated suction grasping device, referred to herein as a CSC, is used in combination with a surface meeting docking assembly to reliably achieve high stiffness attachment of a SAV to an unprepared work surface.

Without being limited to the foregoing theory, it is conjectured that the use of a collapsing suction cup has advantages for absorbing strain of collision or contact with the surface, as well as favourable suction contact conditions for a longer duration than the suction cups, which allowed for the improved suction grasping of the work surface. While some variability in the angles of contact were produced by the test, and it was not determined that the BTCSC always struck first, it is clear from the geometry that the contact points encourage reorientation favouring suction contact with the BTCSC.

The BAM may have a lip pull device, as shown in the embodiment of FIG. 2, either in respect of the CSC, one or more of the secondary cups at the contact points, or both. Applicant has found that the lip pull device is particularly useful for releasing the BTCSC, and has demonstrated a substantial qualitative improvement using the lip pull device. The 2g-BAM prototype incorporating the lip pull device, has a tension line (wire loop) bonded at one end to the outside surface of the BTCSC near the lip (about 2 mm away from the edge) with an epoxy. At the opposite end the tension line is attached to a horn (~3 cm) of a hinge action servo motor (Futaba 53004™).

The tethered BAM was successfully attached to rough, stipled, or porous type surfaces, like concrete. Applicant has found that good attachment force, stability and improved catching was provided with the 1g-BAM modified. Each of the secondary cups was replaced with larger, flat, circular foam rubber cups (127 mm-M12 Connection, ⅜" round foam rubber cups with support from WHY Vacuum Technologies), each having a backing for support. The BTCSC was a long three belly circular foam rubber cup (Piab piGRIP vacuum cup G.FLI70F.F.S1.XXX.00, with a lip diameter of 70 mm, and an actuation depth of 30 mm (75 mm-45 mm)). Three vacuum Venturi pumps are connected to each of the three flat vacuum cups, and a central vacuum cup is shared with one of the flat cups. A set of pneumatic hoses is provided to connect the Venturi pumps to the cups and a compressed air supply.

The tethered BAM was mounted to: a roughened, engineered surface. Standard rubber suction cups could not adhere to this surface; a painted, rough cinder-block wall; and a porous, rough, outdoor concrete surface. In each case the BTCSC stuck to the wall first and applied a force to help the secondary cups to stick to the wall. The secondary cups stick to each of the walls. The vacuum pressure supply of 90 psi was sufficient for the BAM to hold on the wall and the pressure is enough to bear a load of more than 40 kg in each case.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A base attachment module (BAM) configured to be mounted to a small aerial vehicle (SAV), the BAM comprising:
    a rigid body with:
        a mounting end for coupling with a SAV;
        a surface meeting docking assembly (DA) with three or more contact points for contacting a work surface; and
        a contracting suction cup (CSC) adapted to pull the working surface and rigid body together by contraction from an extended pose, to a contracted pose, the CSC mounted to the BAM in a position surrounded by the contact points relative to the contour of the work surface so that in the extended pose, the CSC extends beyond the contour aligned with three of the contact points and so the BAM with the CSC meeting the work surface in the extended pose is precluded from concurrent contact of all the three of the contact points with the work surface; and
    a control system for controlling a pressure within the CSC,
wherein the control system is adapted to apply sufficient suction to the CSC to draw the BAM toward the work surface at least until all the three of the contact points of the DA meet the work surface.

2. The BAM of claim 1 wherein the mounting end comprises one of: a manual, an electromechanical, an electromagnetic, a hydraulic and a pneumatic latching mechanism for opening or closing to release or holding the SAV to the BAM.

3. The BAM of claim 1 where the DA comprises a rigid frame with the 3 or more contact points that are distributed symmetrically around the CSC.

4. The BAM of claim 1 where one or more of the contact points is on a structure that alone, or in combination, increases adhesion of the DA to the work surface.

5. The BAM of claim 1 where the three or more contact points are arranged to follow the contour that is planar, cylindrical, or spherical, and if cylindrical or spherical, has a radius greater than twice a mean separation of the contact points.

6. The BAM of claim 5 one or more of the contact points consists of a plurality of sharp, stiff, micron-scale spikes adapted to be inserted less than 2 mm into the work surface if the work surface is composed of a concrete like material.

7. The BAM of claim 5 one or more of the contact points are secondary suction cups, be they:
passive suction cups adapted to be de-pressurized only by contact with the work surface provided by action of the CSC, gravity, and/or a mechanical pressure applied by thrust of the SAV;
active suction cups adapted to be de-pressurized by a pump produced by the operation of a rotor of the SAV, or by a pressure control system of the SAV, or by the control system;
articulated suction cups;
flat suction cups;
cleated; or
reinforced suction cups.

8. The BAM of claim 7 where:
one or more of the CSC, and suction cups further includes a release mechanism for pulling a lip of the suction cup, to release the BAM; or
the CSC has a diameter at the open end that is smaller than each of the secondary suction cups.

9. The BAM of claim 5 where:
at least one of the contact points comprises an adhesion area that increases the adhesion at the contact point within a limited range of orientations of the area with respect to a local normal of the work surface, and
the contact point further comprises a joint having at least one revolute axis or a directional compliance comprising a resilient body for locally reorienting the adhesion area under a contact force, urging the adhesion area toward the local normal.

10. The BAM of claim 1 wherein the CSC is centred on the contact points in that, during retraction, a leading edge of the CSC passes the plane containing the three contact points within an incircle of a triangle with vertices at the three contact points.

11. The BAM of claim 10 wherein the incircle is more than twice a diameter of the CSC.

12. The BAM of claim 7 wherein the contact points include one or more force applicators adapted to press the work surface away from the BAM, to stress the suction cups and increase a rigidity of the attachment of the BAM to the surface.

13. The BAM of claim 1 where the CSC:
has an actuation depth of at least 30% an unstressed diameter at the open end, and is at most ⅓ a mean separation of the contact points; or
is: a bellows-type suction cup, a bellows-type suction cup with a resilient elastic support; or a suction cup mounted to a mechanism for reciprocating movement.

14. The BAM of claim 7 the secondary suction cups are active, co-actuated, cups and during retraction of the secondary suction cups, a plurality of tertiary contact points contact the work surface, to provide a three stage attachment.

15. The BAM of claim 1 further comprising: a SAV permanently, or temporarily coupled to the mounting end, the SAV rated to carry the BAM; or a robot arm having a base rigidly coupled to the BAM.

16. The BAM of claim 15 electronics and pumps of the control system are integrated with the SAV, or mounted to the BAM.

17. A method for attaching a small aerial vehicle (SAV) by a base attachment module (BAM) to a work surface having no pre-installed mechanical features for attachment, the method comprising:
mounting the BAM to the SAV;
flying the SAV toward a work surface;
on approach to the work surface, directing a surface meeting docking assembly (DA) of the BAM towards the work surface, the DA having three or more contact points for contacting the work surface, and a contracting suction cup (CSC), the CSC extending beyond the three or more contact points so that the CSC meeting the work surface is precluded from concurrent contact with three of the three or more contact points;
contacting the work surface with the CSC; and
applying suction to the CSC to draw the BAM towards the work surface at least until all the contact points of the DA meet the work surface.

18. The method of claim 17 further comprising measuring a pressure within the CSC while applying suction to determine positive engagement of CSC.

19. A kit comprising a BAM according to claim 1, and one of the following:
a SAV configured to be coupled to the mounting end, the SAV rated to lift the BAM;
a robotic arm having a base configured to be rigidly coupled to the BAM;
a plurality of replaceable contact points suitable for different work surfaces; and
a plurality of replaceable CSCs having corresponding actuation depths.

* * * * *